Aug. 31, 1965   J. A. MORESI, JR., ETAL   3,204,156
VENTED ELECTROLYTIC UNIT
Filed May 1, 1961
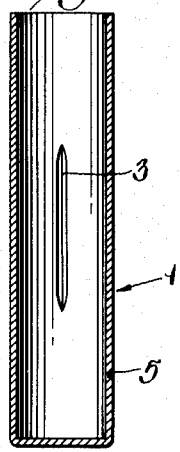
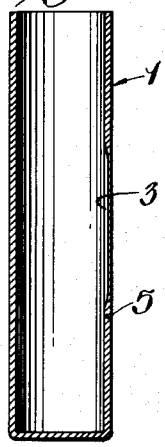
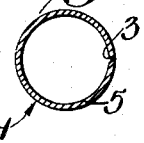
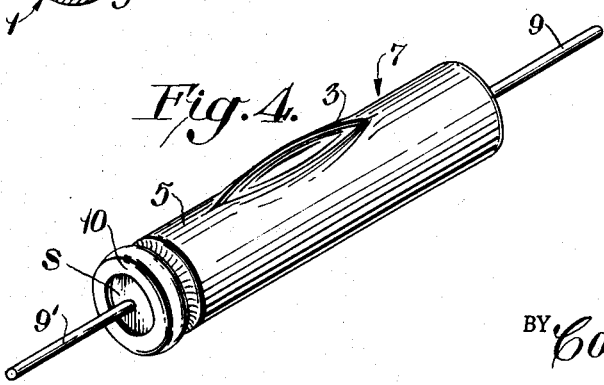
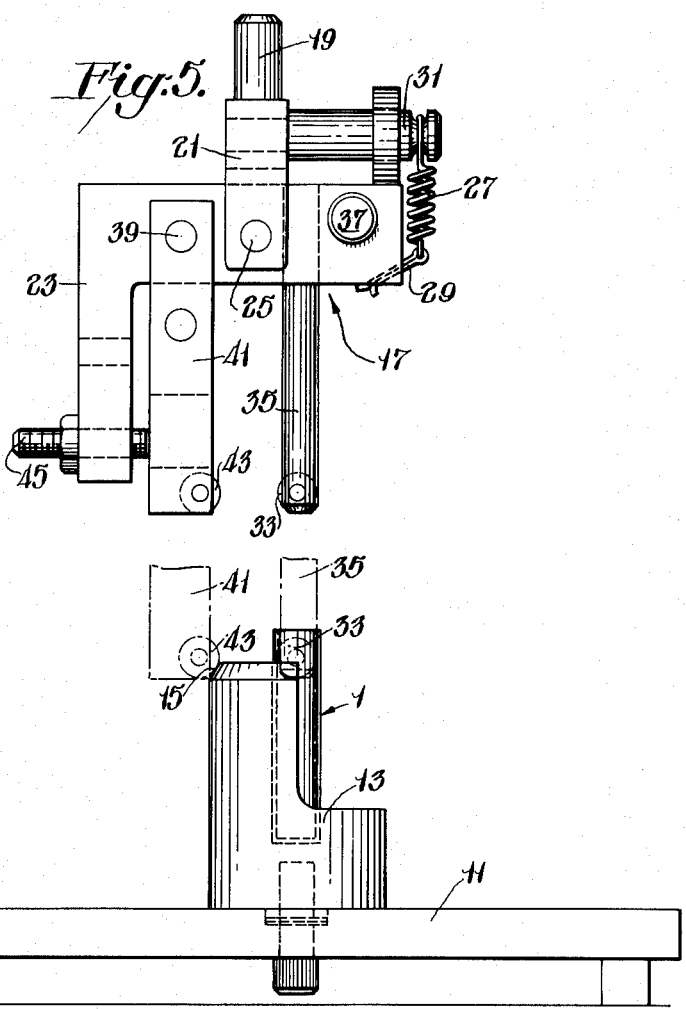
INVENTORS
Joseph A. Moresi, Jr.
Ralph D. Boisjolie
BY Connolly and Hutz
ATTORNEYS

United States Patent Office 3,204,156
Patented Aug. 31, 1965

3,204,156
VENTED ELECTROLYTIC UNIT
Joseph A. Moresi, Jr., and Ralph D. Boisjolie, North Adams, Mass., assignors to Sprague Electric Company, North Adams, Mass., a corporation of Massachusetts
Filed May 1, 1961, Ser. No. 106,683
10 Claims. (Cl. 317—230)

The present invention relates to vented and hermetically sealed electrolytic capacitors which vents open in response to an excessive gas pressure build up in the capacitor can to permit the safe release of the internal gas pressure. The gas pressure build up initiates with the electrolyte solution contained in the capacitor can.

With large electrolytic capacitors, it has been the custom to provide safety pressure release vents or means in the closure element for the capacitor can. In most of these instances the closure element or can bottom has a weakened portion of silicone, wax, or solder which will give away in response to a gas pressure and/or temperature build up beyond a predetermined point. This arrangement has worked very satisfactorily for the large type capacitors. However, with the advent of small electrolytic capacitors having a diameter of approximately one inch or less, it was found that the pressure release vent could not be incorporated in the can closure since the closure itself was of such a minute nature. In many of these miniature capacitors the pressure build up exceeds 2000 lbs./sq. in. These small capacitors were therefore made without vents and proceed to be generally satisfactory. However, a real hazard is created by a misuse in a circuit or a fault in construction of the capacitor container or closure. The closure seals are expelled like bullets when the internal pressure builds up to the puncturing point.

Hence there is a real need for a reliable and effective vent for small capacitors. Also, there is a need for a more reliable and less expensive vent for the larger capacitors.

It is, therefore, an object of this invention to provide hermetically end sealed electrolytic capacitors of all sizes which have new and novel pressure-release vents which will safely release an excessive pressure build up within the capacitor can.

Another object of the invention is to provide capacitors of the above object having a pressure release vent in the form of a longitudinal or axial cut in a portion of the inner wall of the capacitor can.

A further object of the invention is to provide a new and novel method for making the cut or vent in the inner wall of the capacitor can.

Still another object of the invention is to provide an apparatus for forming the desired vent of the above objects.

Additional objects and advantages of the invention will become more apparent after a study of the following description and drawing wherein:

FIGURE 1 is a section of the vented capacitor can showing the longitudinal vent or cut in the inner surface of the can.

FIGURE 2 is a section of the capacitor can showing the cut or vent from a different angle.

FIGURE 3 is a top section of the capacitor can shown in FIGURES 1 and 2.

FIGURE 4 is a view of a complete capacitor which has burst along the vent or cut because of excessive internal pressure.

FIGURE 5 is a view of the apparatus used for forming the vent or cut in the inner surface of the side wall capacitor can.

Referring now to the drawing, the capacitor can 1, formed of aluminum, copper, brass or silver, has a thin longitudinal or axial vent or cut 3 cut into the side wall 5 of the can 1. The vent or cut 3 is located below the end seal area. In the preferred embodiment, the can wall is at least 0.01 inch thick while the cut or vent 3 leaves about 0.004 inch of wall. As mentioned above, the can 1 has approximately a one inch or less outside diameter. The length of can 1 varies from one-half inch to about four inches generally. The walls of the vent or cut 3 are tapered outwardly at approximately a 45 degree angle as they extend toward the can 1 interior. For a can 1 which is one and a half inches long, the cut or vent 3 extends for approximately one-half inch.

FIGURE 4 shows a completed capacitor generally identified as 7 having leads 9, 9'. The open end of the can has been hermetically sealed. During this operation, the lip of the can 10 is rolled over the end seal S. Here, the vent 3 has burst because of excessive internal gas pressure. The vent 3 is of such a strength that it will resist bursting up to about approximately 600–700 lbs./sq. in. pressure for the capacitor having the dimensions described above. The weakest part of the capacitor is this rolled over lip 10. The end seal usually holds up to 2000 lbs./sq. in. pressure. Beyond this pressure, the end seal S is expelled by rolling back the lip. The axial cut 3 will rupture at approximately 600–700 lbs./sq. in. pressure whereby a good safety factor is provided.

Capacitor cans are usually produced by a drawing process, which for metallurgical reasons provides a crystallographic structure that is weakest along the axis. Thus, with strain lines along the axis, the axial cut of this invention produces a vent with the full pressure exerted against a weakened portion of the weakest wall of the can; again, a safety factor.

The cut is made on the inside of the can for a reason beyond the aesthetic demand for a smooth outer wall, and the possible advantages of the internal V to uniform bursting. This special reason is to keep the doodlers who stick pencils in capacitor end vents from being tempted to break the weakened can wall with sharp fingernails.

FIGURE 5 shows an apparatus for forming the cut or vent 3 in the wall of the capacitor can 1. As seen therein, a base support 11 in turn supports a can block 13. The can block 13 is chamfered at its upper left hand corner to form chamfer 15. The capacitor can 1, open end up, is firmly supported vertically in a can positioning hole formed in the block 13. Supported above the can block 13 is a vertically reciprocating cutting tool generally identified as 17. Essentially, the tool 17 consists of rod support 19 which in turn is supported in the jaws of a gripping device (not shown) which is capable of vertical reciprocation. The supporting rod 19 is permanently connected to a block 21 from which depends a pivotable L-shaped bracket 23. The L-shaped bracket 23 is pivoted on the block 21 by pivot member 25. To limit the L-shaped bracket 23 from freely pivoting on pivot 25, a restraining spring 27 is anchored on a cotter pin 29 secured to the lower right hand end of the L-shaped bracket 23. The other end of the spring 27 is supported over the end of a pin 31 in turn permanently supported by the block 21. A freely rotatable cutting disc 33 is supported at the lower end of an arm 35 which in turn is supported by the L-shaped bracket 23. The arm 35 is supported by a locked jaw arrangement in bracket 23, which jaws are tightened by tightening screw 27.

Also pivoted to the L-shaped bracket 23 on pivot member 39 is a guide arm 41 having a freely rotatable guide wheel 43 at the lower end thereof. The position of pivotable arm 41 with respect to the cutting tool arm 35 is adjusted by an adjusting screw 45 which extends through L-shaped bracket 23 and against the guide arm 41.

In operation, a capacitor can 1, open end up, is inserted in the can block 13. The rod 19 is then lowered whereby the cutting disc 33 of the arm 35 is inserted in the interior of can 1. Upon further lowering of the rod 19, the guide wheel 43 of guide arm 41 strikes the chamfer surface 15 of the can block 13 to pivot the L-shaped bracket 23 slightly to the left whereby the cutting disc 33 moves into contact with the inner wall of the can 1. Upon further descent of the rod 19 the cutting disc 33 moves downwardly against and along the can wall to form the small slice, cut or vent 3 in the can wall. FIGURE 5 shows cutting tool 17 in both the raised position and in its can cutting position (dotted lines).

After the above, the hermetic end seal is provided and the lip of the open end of the can is rolled over to complete the closure.

The following examples should be understood to be illustrative only and in no way limitative of the article and method of this invention.

A drawn aluminum can that is 13/16 inch long and has a diameter of 3/8 inch has a seal rupture (cover blow out) pressure of approximately 2000 p.s.i. when sealed by rolling the can lip onto a closure member. The preferred venting pressure of this invention of 600 to 700 p.s.i. was attained by an internal V-shaped axial cut of 3/8 inch length located below the seal area and leaving a can wall of 3.1 mils. Eighty cans vented according to this invention were found to have an average vent rupture of 620 p.s.i.

A drawn aluminum can 3/8 inch diameter x 1 5/8 inches long has a cover blow out pressure of approximately 1700 p.s.i. The desired 600 to 700 p.s.i. venting pressure was attained by an internal V-shaped cut 9/16 inch long leaving 4.1 mils of can thickness. Sixty such cans had an average vent rupture of 620 p.s.i.

Throughout this specification axial cut 3 has been described in its preferred embodiment of being cut into the inner wall of can 1. It should be understood to be within the concept of this invention to produce an external axial cut, or a combined cut from both sides, should the economics demand. However, it should be noted that in both the preferred inside cut and these lesser embodiments that the cut is not to be all the way through the can wall. A through cut would prevent the attainment of a hermetically sealed capacitor, and would permit the possibility of electrolyte loss.

In a like manner, although the apparatus has been described to make the preferred inner cut, it should be understood that apparatus within the concept of this invention could be constructed to make an axial cut into the outside wall.

Therefore, it is to be understood that changes and variations may be made in the present invention without departing from the spirit and scope of the same as defined in the appended claims.

What is claimed is:

1. A vented can for an electrolytic unit comprising a lengthwise cut in and along the inner surface of the side wall of the can, said side wall having a thickness of at least 0.01 inch, and said cut leaving a wall thickness of approximately .004 inch.

2. The can according to claim 1 wherein the can is formed of aluminum.

3. The can according to claim 1 wherein the cut is located below the end sealing area of the can.

4. A vented electrolytic unit comprising an open ended can, an electrolytic device sealed within the can, leads extending through the seal and from the bottom of the can, and a lengthwise cut in and along the inner surface of the can.

5. The capacitor according to claim 4 wherein the cut is located below the can closure.

6. A vented can for housing a sealed electrolytic device comprising an axially extending wall portion which is thinner than the remaining wall portion of the can.

7. The can according to claim 6 wherein said axially extending wall portion has a thickness of about .004 in.

8. An electrolytic unit comprising an open ended can, an electrolytic device sealed within the can, and leads extending through the seal and from the bottom of the can, said can having an axially extending wall portion which is thinner than the remaining wall portion of the can.

9. An electrolytic unit comprising an open ended can, an electrolytic device sealed within the can, and leads extending through the seal and from the bottom of the can, said can being about 13/16 inch in length and having a diameter of about 3/8 inch, an axially extending wall cut of about 3/8 inch in length in the inner surface of the can wall which leaves a can wall thickness of about 3.1 mils along said axial cut.

10. An electrolytic unit comprising an open ended can, an electrolytic device sealed within the can, and leads extending through the seal and from the bottom of the can, said can being about 1 5/8 inches in length and having a diameter of about 3/8 inch, an axially extending wall cut of about 9/16 inch in length in the inner surface of the can wall which leaves a can wall thickness of about 4.1 mils along said axial cut.

References Cited by the Examiner

UNITED STATES PATENTS

| 2,051,640 | 8/36 | Kruse | 29—533 |
| 2,060,866 | 11/36 | Heteniji | 317—230 |
| 2,064,183 | 12/36 | Sprague et al. | 317—230 |
| 2,139,437 | 12/38 | Biniek | 317—230 |
| 2,525,436 | 10/50 | Williams | 220—89 |
| 2,677,313 | 5/54 | Biegert | 83—5 |
| 2,801,693 | 11/57 | Lorig | 83—5 |
| 3,010,202 | 11/61 | Fromson | 29—533 |

FOREIGN PATENTS 767,372    6/52    Germany.

JOHN W. HUCKERT, *Primary Examiner.*

JAMES D. KALLAM, *Examiner.*